US008582451B2

(12) United States Patent
Hannu et al.

(10) Patent No.: US 8,582,451 B2
(45) Date of Patent: Nov. 12, 2013

(54) CODE ASSIGNMENT IN HS-SCCH LESS OPERATION MODE

(75) Inventors: Hans Hannu, Luleå (SE); Mårten Ericson, Luleå (SE); Per Synnergren, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 558 days.

(21) Appl. No.: 12/674,710

(22) PCT Filed: Aug. 23, 2007

(86) PCT No.: PCT/SE2007/050570
§ 371 (c)(1),
(2), (4) Date: Feb. 23, 2010

(87) PCT Pub. No.: WO2009/025598
PCT Pub. Date: Feb. 26, 2009

(65) Prior Publication Data
US 2011/0110245 A1    May 12, 2011

(51) Int. Cl.
*H04L 12/28* (2006.01)
(52) U.S. Cl.
USPC .......................................... 370/252; 370/342
(58) Field of Classification Search
USPC .................. 370/241, 252, 255, 328, 335, 342
See application file for complete search history.

(56) References Cited

U.S. PATENT DOCUMENTS

| 8,154,982 B2 * | 4/2012 | Lindheimer et al. .......... 370/208 |
| 2005/0078648 A1 * | 4/2005 | Nilsson .......................... 370/342 |
| 2005/0226267 A1 * | 10/2005 | Pedersen et al. .............. 370/465 |
| 2008/0144593 A1 * | 6/2008 | Tseng ............................ 370/342 |
| 2008/0175203 A1 * | 7/2008 | Jen ................................ 370/331 |

FOREIGN PATENT DOCUMENTS

| EP | 1513297 A1 | 3/2005 |
| WO | 03/107707 A1 | 12/2003 |
| WO | 2005048469 A2 | 5/2005 |

OTHER PUBLICATIONS

Lee, O.-S., et al. "Transmission Scheduling Scheme for Multicode WCDMA/TDD Networks." IEEE VTS 54th Vehicular Technology Conference, 2001 (VTC 2001 Fall), vol. 2, Oct. 7-11, 2001, pp. 812-816.
Oyefuga, O. O. et al. "A Capacity Improvement and Call Admission Control Algorithm for Wideband CDMA Wireless Networks." 10th IEEE International Conference on Networks, 2002 (ICON 2002), Section 3, Aug. 27-30, 2001, pp. 277-282.
Motorola, Improving VoIP performance for HSDPA by reduced HS-SCCH or by in-band control signalling with grouping, 3GPP TSG RAN WG1#46, Tallinn, Estonia, R1-062422, Aug. 28-Sep. 1, 2006.

* cited by examiner

*Primary Examiner* — Yemane Mesfin
*Assistant Examiner* — Mon Cheri Davenport
(74) *Attorney, Agent, or Firm* — Coats & Bennett, P.L.L.C.

(57) ABSTRACT

In a method and a system a good spread of users per code is obtained by providing a value related to the current load for each code in the system. The estimated load value can be used by the network to assign the HS-PDSCH code for users in HS-SCCH less operation, and may also be used in the dynamic transmission process, i.e. which codes are to be used by which user during this and future TTIs. If one code is over a given utilization threshold, where the threshold is set in order to avoid code blocking of VoIP users, enough users can be re-assigned to a different code. In the case that all of the current codes used in the HS-SCCH less operation model are over the utilization threshold, yet another code can be made available for HS-SCCH less operation.

16 Claims, 3 Drawing Sheets

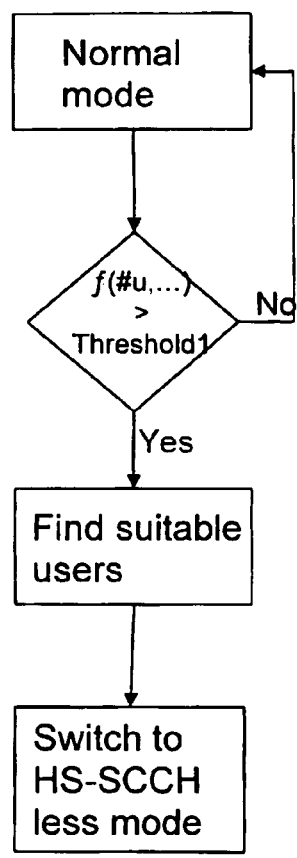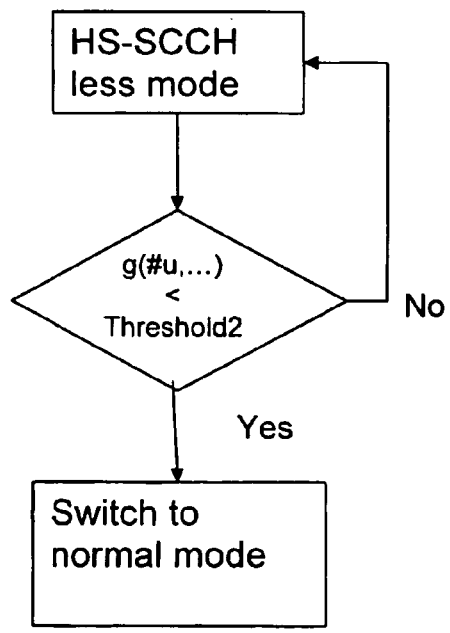
Fig. 2a
Fig. 2b

CODE ASSIGNMENT IN HS-SCCH LESS OPERATION MODE

TECHNICAL FIELD

The present invention relates to a method and a system for assigning codes. In particular the present invention relates to a method and a system for assigning codes in a cellular radio system employing a High Speed-Shared Control Channel (HS-SCCH) less mode of operation

BACKGROUND

Today mobile broadband services over cellular systems are becoming more and more common. One underlying reason is the introduction of High Speed Packet Access (HSPA) radio bearers in live networks. There is also an increased interest in IP Multimedia Subsystem (IMS) based services, such as Voice over IP (VoIP), and Push to talk over Cellular (PoC).

HSPA introduces the possibility of downloading and uploading data with a speed of several Mbits/s, but there is also standardization work ongoing in 3GPP to boost VoIP capacity.

In High Speed Downlink Packet Access (HSDPA) a shared channel is employed. The use of a shared channel results in that several channelization codes are shared between users on a per 2 ms TTI basis for transmission.

In HSDPA the basic shared channel structure includes a number of codes, for example 8, which are available for High Speed-Downlink Shared Channel (HS-DSCH) transmission every 2 ms TTI. A user can use all codes, such as all 8 if 8 codes are available, or the codes can be divided between users during the 2 ms Transmission Time Interval (TTI). Dividing codes between different users is usually referred to as code multiplexing, i.e. the users are multiplexed on the same TTI by being assigned different codes. The UMTS Terrestrial Radio Access Network (UTRAN) assigns a number of High Speed Shared Control Channels (HS-SCCHs) to match the number of code multiplexed users.

Although a mobile station is only required to be able to listen to a maximum of 4 HSSCCHs more than HS-SCCHs can be deployed per cell. The HS-SCCH carries information about which channelization codes that a mobile station is to decode, the User Equipment (UE) identity, which identifies the receiver of the information, Hybrid Automatic Repeat Request (HARQ) parameters and Transport Format and Resource Combination (TFRC) i.e. modulation scheme, channelization code set and transport block size, etc.

Studies show that in order to allocate many VoIP calls in a single cell more than 4 HS-SCCHs must be used. By allocating more than 4 HS-SCCHs per cell and spread out the UEs on these in a smart way higher code multiplexing than 4 can be used. However, as the VoIP service is comparably low rate service the HS-SCCH overhead may be high. Therefore a study item in 3GPP called continuous packet connectivity (CPC) investigated several schemes to improve services like VoIP, with focus on reducing overhead, see [3GPP TR25.903].

One improvement was the so called HS-SCCH less operation mode. Basically, in HS-SCCH less mode, the HS-SCCH overhead can be reduced by simply being removed or introducing discontinuous transmission. The disadvantage is that only a few transport format combinations (TFC). i.e. packet sizes, can be used which are semi-static and configurable per UE. The UE makes a so called blind decoding assuming the configured packet sizes. In the currently proposed standard, two (2) different Transport Block (TB) sizes are allowed in HS-SCCH less operation, and four (4) different TB sizes are allowed in Reduced Complexity HS-SCCH-less operation. If other TFCs or TB sizes are needed than these two or four, then the normal High Speed Dedicated Physical Control Channel HS-DPCCH must be used. For VoIP this is not a critical limitation.

In normal operation mode, the network receives feedback information such as channel quality indications and ACK/ NACKs, on the uplink channel HS-DPCCH. The network utilizes that information in the downlink scheduling decision and in the HARQ process. The downlink HS-SCCH indicates to the user which HS-DPSCH it shall decode, the HARQ process number and a CRC. Both parts employ a terminal specific masking, which is used by the mobile station/terminal to determine that the data is actually intended for it. Finally the mobile station/terminal despreads the data sent on the HS-PDSCHs.

If HS-SCCH less operation is used, each VoIP user in HS-SCCH less operation is assigned a specific code, or HS-PDSCH channel, at the start of the session. Hence, the code assignment is highly important, and care should be taken to avoid code blocking as the mobile stations in HS-SCCH less mode only try blind decoding on the given pre-defined HS-PDSCH code, i.e. channelization code. It is of course possible to change this code, but not instantaneously since it requires an RRC message, see 3GPP TS 25.308.

Code blocking is when the scheduler assigns two or more users to transmit in the same TTI, but since they use the same HS-PDSCH code this is not possible. In normal operation the code assignment is done on the fly by using the HS-SCCH to point out the HS-PDSCH code.

Today there exist no solution to handle this situation. One solution could be to assign x out of C possible HS-PDSCH codes, for all VoIP users, and all other codes (C-x) for other (non CPC) services, such as web browsing, etc. It should be noted that the network cannot transmit during the same TTI to users in HS-SCCH less operation which are assigned the same code.

However, when the number of VoIP users increases in the cell such a solution is less efficient. When the number of VoIP users increases and dominates the traffic in cell, the probability to simultaneously transmit to many VoIP users increases. And since the code limit is fixed, there is always a chance that the need for codes exceeds that code limit. Without HS-SCCH less operation and CPC. 4 users per TTI was typically the code limit. This since the standard stipulated that each UE only listens up to 4 groups of codes (HS-SCCH channels). Furthermore, it is not obvious how to spread the users among the codes available.

Hence, there exist a need for a method and a system that is able to handle many VoIP calls in a single cell.

SUMMARY

It is an object of the present invention to overcome or at least reduce some of the problems associated with set up of many VoIP calls in a cell of a cellular radio system.

It is another object of the present invention to provide a system and a method that enables efficient assignment of codes to mobile stations in order to achieve efficient transmission and capacity.

These objects and others are obtained by the method and system as set out in the appended claims. Thus, by providing a good spread of users per code, the VoIP capacity limit can be increased and maximized. This since it is not possible to transmit to two users with the same code during one TTI. Instead a traffic load value, such as an intensity value, is estimated per user. As input to the estimation function a value related to the current load in the system can be used.

For example input to the estimation function may include parameters such as, MAC-hs buffer level, packet arrival time, number of retransmissions, etc. The estimated intensity value can be used by the network to assign the HS-PDSCH code for users in HS-SCCH less operation, and may also be used in the dynamic transmission process, i.e. which codes are to be used by which user during this and future TTIs.

If one code is over a given utilization threshold, where the threshold is set in order to avoid code blocking of VoIP users, enough users can be re-assigned to a different code. In the case that all of the current codes used in the HS-SCCH less operation model are over the utilization threshold, yet another code is preferably made available for HS-SCCH less operation.

BRIEF DESCRIPTION OF THE DRAWINGS

The present invention will now be described in more detail by way of non-limiting examples and with reference to the accompanying drawings, in which:

FIGS. 2a and 2b are illustrations of a switching scheme between different operation modes in a cellular radio system.

DETAILED DESCRIPTION

Figure 1:
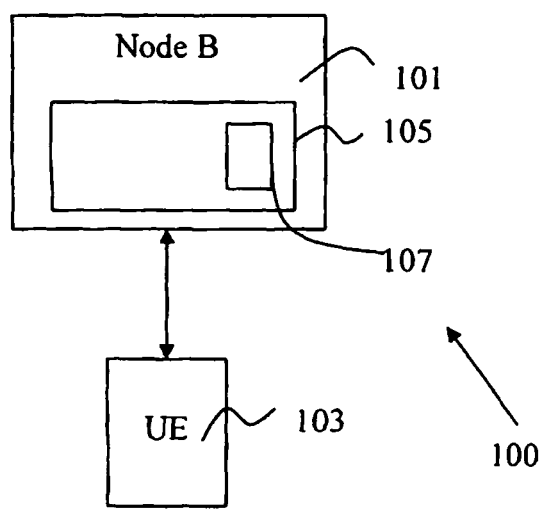
FIG. 1 is a view illustrating a cellular radio network where a number of mobile stations are enabled to communicate using a HS-SCCH less operation mode.

In FIG. 1 a view illustrating a part of an exemplary cellular radio system 100 is shown. The system 100 is enabled to operate in a HS-SCCH less mode. The system 100 comprises a number of base stations, NodeBs, 101 whereof one is depicted in FIG. 1. Each base station 101 can be used to establish radio communication with a number of mobile stations 103, User equipments UE, camping with in the coverage area of a base station. The base station 101 comprises a module 105 (i.e., a code assignment circuit) for assigning codes to the mobile stations and also the base station 101 comprises a unit 107 (i.e., a load determination circuit) for estimating the load of in the cell serviced by the base station as is described more in detail below.

In normal, non-HS-SCCH less, operation, the maximum number of HS-PDSCH codes used by the base station 101 of FIG. 1 are for example equally divided by the (maximum four) users, i.e. the code assignment is done on the fly. However, this is not possible for users using HS-SCCH less operation. Therefore, it is important to carefully assign the codes to the HS-SCCH less users so that code blocking does not occur between the HS-SCCH less users or between other users.

Hence, optimally the HS-SCCH less users should be assigned codes by the base station 101 in such a way that during high load situations there are no holes/gaps in the time/code structure.

To achieve a transmission pattern where there are no holes/gaps in the time/code structure an estimation algorithm/function as described below can be used. Thus in order to evenly spread the HS-SCCH less users, the system is provided with the unit 107 for estimating the load, i.e. the relative time the service needs to transmit in the down link.

For example take VoIP using an Adaptive Multi Rate (AMR) codec as an example assume a certain activity rate $\lambda_s$, e.g. a packet will be transmitted every 20 ms (activity rate of 1/10). By summing the total activity rate for a certain service (in our example VoIP), a measure of how often the service will utilize the down link channel is acquired. As long as the sum is lower than a certain threshold the same HS-PDSCH can be used. When the threshold is exceeded, a new HS-PDSCH code is assigned to the new users.

In a preferred embodiment the service load per code, taking VoIP as example, is based on one or more of the following parameters:

The number of conversational (VoIP) RABs
The packet arrivals per TTI
Retransmissions
Buffer levels Additionally radio resources/conditions such as transmitter power and signal strengths can be taken into account.

The HS-SCCH mobiles are assigned a HS-PDSCH code according to the total service load above. Further, the HS-PDSCH code assignment is preferably continuously updated for the codes to be spread evenly, since some users will hang up or be inactive for a longer period.

In FIG. 2a a flow chart illustrating steps performed when switching between a normal mode and a HS-SCCH less mode in a base station is shown. Thus, if the system is handling users in a normal mode of operation and the maximum number of codes or other radio resource such as power and signaling overhead required to maintain operation is below a first threshold value, Threshold1, as determined by comparing a first function with the first threshold value, the operation can continue in a normal mode of operation. If however it is determined by comparing said first function of existing users with the first threshold that at least some of the users need to be transferred to a HS-SCCH less mode of operation at least some of the users are transferred to the HS-SCCH less mode.

Similarly in FIG. 2b a flow chart illustrating steps performed when switching between a HS-SCCH less mode and a normal mode in a base station is shown. Thus, if the system is handling users in a HS-SCCH less mode of operation and the maximum number of codes or other radio resource such as power and signaling overhead required to maintain operation is above a second threshold value, Threshold2, as determined by comparing a second function with the second threshold value, the operation will continue in HS-SCCH less mode of operation. If however it is determined by comparing said second function of existing users with the second threshold that at least some of the users can be transferred back to a normal mode of operation at least some of the users may be transferred to the normal mode. The first and second function and thresholds used for determining switching between the two modes may but don't have to be the same functions and thresholds, respectively.

Figure 3:
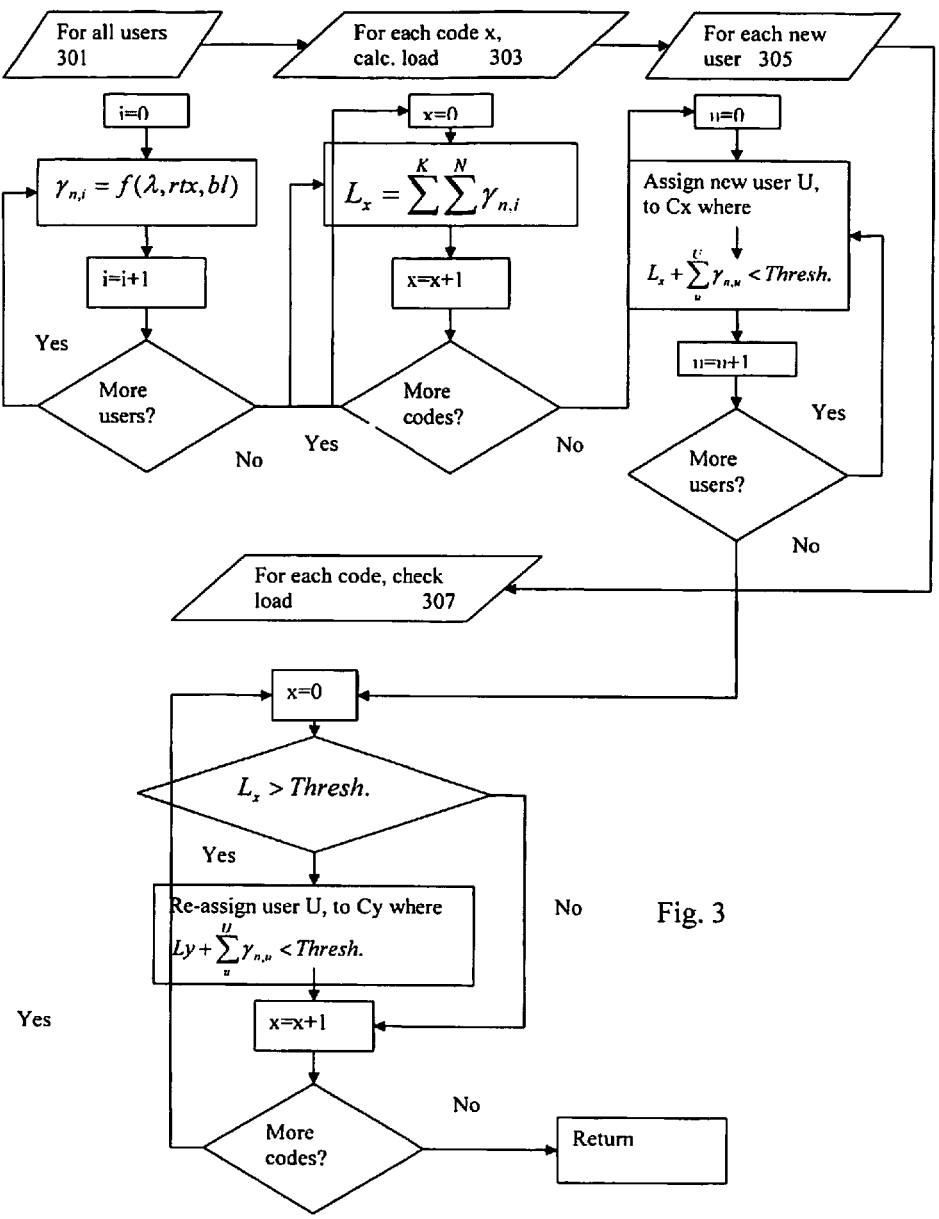
FIG. 3 is a flow chart illustrating a procedure for assigning codes in a cellular radio system.

In FIG. 3, a flow chart illustrating a procedure for assignment of codes in a system supporting a HS-SCCH less transmission mode for users in a HS-SCCH less mode of operation. First in a step 301 the load generated by each user is determined. The load can for example be determined using a function of a number of parameters indicative of the load such as packet arrival rate, number of re-transmission, buffer level, etc. Next in a step 303 for each of the available codes the combined load by all users assigned to that particular code is determined.

Next, in a step 305, each new user is assigned to a code which satisfies the condition that the estimated additional load added by the new user and the existing load of that code together is below a threshold value for that particular code. Next, in a step 307 the procedure continuously or periodically checks the load for each code against the determined threshold for each code. If the load for a particular code is exceeded, one or more users using that particular code is re-assigned to another code. If no code is available to transfer such users to a new code is generated.

In equation form this can be expressed as follows;

$$L_x = \sum_n^K S_n \quad [\text{eq1}]$$

$L_x$: Load on code $x$
$S_n$: Service $n$
$K$: number of services $$S_n = \sum_i^N \gamma_{n,i} \quad [\text{eq2}]$$

$\gamma_{n,i}$: load of service$_n$ by user$_i$
$N$: number of users $$\gamma_n = f(\lambda, rtx, bl) \quad [\text{eq3}]$$

$f$: function
$\lambda$: packet arrival rate
$rtx$: number of retransmissions
$bl$: buffer level The function in equation 3 may simply be the packet arrival rate plus a filtered retransmission value, for example as a mean value that could apply to the buffer level.

If the load is larger than a threshold value, the network is adapted to re-assign HS-SCCH users to a different code. In accordance with one embodiment, the code multiplexing can be increased if all codes have higher load than the given threshold. This is illustrated in equation 4.

$$\text{if } L_x > Th, \text{ then assign user}_i \text{ to } L_y, \text{ where } L_y + \gamma_{n,i} \leq Th \quad [\text{eq 4}]$$

Equation 3 gave three input parameters to estimate the contribution to the load value of a user. However, other input parameters such as power usage and interference levels and similar may be added to the function. The threshold value of equation 4 may also be used to accomplish different objectives such as;
equal power usage per code
equal share of traffic per code Using the method and system as described herein will avoid that system (VoIP) capacity and the capacity of similar services is unnecessarily limited due to code shortage. Further, the interference spread per user will be decreased.

The invention claimed is:

1. A method implemented by a node in a cellular radio system for assigning codes for users in the system operating in a High Speed Shared Control Channel (HS-SCCH) less mode of operation, the method comprising:
   determining the system load generated by a user communicating with the system in a HS-SCCH less operation mode; and
   assigning a code for the user in response to said determined system load, wherein said assigning comprises determining, for each available code, the combined system load generated by all users currently assigned to that code and further comprises either:
   assigning the user to an available code if the combined system load for that available code plus the system load determined for the user would not exceed a predetermined utilization threshold value; or
   responsive to determining that, for each available code, the combined system load for that available code plus the system load determined for the user would exceed the predetermined utilization threshold value, making another code available and assigning that newly available code to the user.

2. The method of claim 1, wherein assigning a code for the user comprises assigning a High Speed Physical Downlink Shared Channel (HS-PDSCH) code.

3. The method of claim 1, wherein determining the system load generated by a user comprises determining the system load based on one or many of the following parameters:
   MAC-hs buffer level;
   packet arrival time;
   number of re-transmissions;
   transmit power usage; and
   interference level.

4. The method claim 1, further comprising:
   determining if one used code is above the predetermined utilization threshold value.

5. The method of claim 4, wherein, if said one used code is determined to be above the predetermined utilization threshold value, one or more users assigned to that code is reassigned to another code.

6. The method of claim 4, further comprising:
   making another code available if all used codes exceed their respective predetermined utilization threshold values.

7. The method of claim 1, further comprising:
   continuously or periodically determining the load caused by all users of a particular code and comparing said combined load to the pre-determined utilization threshold value.

8. The method of claim 7, wherein, if a used code is determined to be above the predetermined utilization threshold value, one or more users assigned to that code is reassigned to another code.

9. A node of a cellular radio system operating in a High Speed Shared Control Channel (HS-SCCH) less mode of operation, the node adapted to assign codes for users and comprising:
   a load determination circuit configured to determine the system load generated by a user communicating with the system in a HS-SCCH less operation mode, and
   a code assignment circuit configured to assign a code for the user in response to said determined system load, by determining, for each available code, the combined system load generated by all users currently assigned to that code and further by either:
   assigning the user to an available code if the combined system load for that available code plus the system load determined for the user would not exceed a predetermined utilization threshold value; or
   responsive to determining that, for each available code, the combined system load for that available code plus the system load determined for the user would exceed the predetermined utilization threshold value, making another code available and assigning that newly available code to the user.

10. The node of claim 9, wherein the code assignment circuit is configured to assign a High Speed Physical Downlink Shared Channel (HS-PDSCH) code.

11. The node of claim 9, wherein the load determination circuit is configured to determine the system load based on one or many of the following parameters:
    MAC-hs buffer level;
    packet arrival time;
    number of re-transmissions;
    transmit power usage; and
    interference level.

12. The node of claim 9, wherein the load determination circuit is further configured to determine if one used code is above the predetermined utilization threshold value.

13. The node of claim 12, wherein the code assignment circuit is configured to re-assign one or more users assigned to said one used code to another code, if said one used code is determined to be above the predetermined utilization threshold value.

14. The node of claim 12, wherein the code assignment circuit is configured to make another code available if all used codes exceed their respective predetermined utilization threshold values.

15. The node of claim 9, wherein the load determination circuit is configured to continuously or periodically determine the load caused by all users of a particular code and compare said combined load to the pre-determined utilization threshold value.

16. The node of claim 15, wherein the code assignment circuit is configured to re-assign one or more users assigned to a code to another code, if that code is determined to be above the pre-determined utilization threshold value.

* * * * *

UNITED STATES PATENT AND TRADEMARK OFFICE
CERTIFICATE OF CORRECTION

PATENT NO. : 8,582,451 B2  
APPLICATION NO. : 12/674710  
DATED : November 12, 2013  
INVENTOR(S) : Hannu et al.

Page 1 of 1

It is certified that error appears in the above-identified patent and that said Letters Patent is hereby corrected as shown below:

In the Specification:

In Column 1, Line 41, delete "HSSCCHs more than" and insert -- HS-SCCHs more than 4 --, therefor.

In the Claims:

In Column 6, Line 15, in Claim 4, delete "method claim" and insert -- method of claim --, therefor.

Signed and Sealed this  
Twenty-seventh Day of May, 2014

Michelle K. Lee  
*Deputy Director of the United States Patent and Trademark Office*